United States Patent [19]

Sakurada

[11] 4,305,179
[45] Dec. 15, 1981

[54] HOSE CLAMP
[75] Inventor: Hiroshi Sakurada, Toyonaka, Japan
[73] Assignee: Toshikazu Okuno, Izumiohtsu, Japan
[21] Appl. No.: 154,987
[22] Filed: May 30, 1980
[30] Foreign Application Priority Data
  Jul. 30, 1979 [JP] Japan .................... 54-105880[U]
[51] Int. Cl.³ .................... B65D 63/02; F16L 3/08
[52] U.S. Cl. .................... 24/20 R; 24/20 CW;
  24/22; 24/23 R; 248/74 B; 403/351; 403/DIG. 7
[58] Field of Search ............ 24/20 R, 20 CW, 20 S,
  24/22, 23 R, 279; 248/74 B, 226.5, 316 D;
  403/351, 352, DIG. 7

[56] References Cited
U.S. PATENT DOCUMENTS

| 477,227 | 6/1892 | Redfield | 24/279 |
| 506,337 | 10/1893 | Pierpont | 24/20 R |
| 513,322 | 1/1894 | Hart | 24/279 |
| 1,290,974 | 1/1919 | Gragg | 24/22 |
| 1,379,476 | 5/1921 | Parr | 24/20 CW |
| 2,285,850 | 6/1942 | Weeks | 24/20 S |
| 2,331,098 | 10/1943 | White et al. | 248/74 B |
| 3,087,221 | 4/1963 | Armstrong | 24/20 CW |
| 3,334,388 | 8/1967 | Turbyfill | 24/279 |

FOREIGN PATENT DOCUMENTS 2361412  6/1974  Fed. Rep. of Germany ........ 24/279

Primary Examiner—Victor N. Sakran
Attorney, Agent, or Firm—Armstrong, Nikaido, Marmelstein & Kubovcik

[57] ABSTRACT

A hose clamp having a thickness that is maximum at its longitudinal center and is decreased symmetrically on each side of center progressively in proportion to the distance from the center until reaching end portions of uniform thickness. The band is bent into an annular shape with the ends overlapping. The ends are provided with holding portions projecting radially outward.

1 Claim, 2 Drawing Figures

HOSE CLAMP

BACKGROUND OF THE INVENTION

This invention relates to a hose clamp, particularly to a clamp for tightly connecting a plastic or rubber hose with the end of a metal tube.

The hose clamp is generally known which is manufactured by bending a piece of a metal sheet or wire into an annular shape to surround the hose. Preferably, the hose clamp always maintains the annular shape in a perfectly circular state and presses the entire annular surface of the hose uniformly with equal force, even if the hose clamp is applied to a hose having somewhat different outside diameters. The hose clamp, however, has been rarely available hitherto which can meet such demands as mentioned above. If the hose clamp meeting the demands is available, the hose clamp has serious defects in other respects. Hence the clamp cannot be satisfactory as a whole.

For example, in Japanese Patent Publication No. 51-3923 and Japanese Utility Model Publication No. 52-5308 is disclosed a hose clamp which is formed by bending an elastic band metal into an annular form to overlap both ends of the band metal, providing each of the ends with a finger grippable portion projecting in the outward direction and further, in order to equalize the elastic action of the sheet metal, providing the band metal symmetrically with one or more apertures in the form of a triangle or a narrow band. The hose clamp, however, has the disadvantages that the clamp is not economically manufactured because the apertures weaken the original elastic force of the band metal and the band metal should be employed having more thickness or width. Furthermore, the Japanese Utility Model Publication No. 53-19458 discloses a hose clamp in which sheet metal is bent in an annular form and provided with one or more projections extending symmetrically from the center in the circular direction with a progressively diminishing height in proportion to a distance from the center. The projection, however, must be formed by forcible extension of the sheet metal, which is liable to produce cracks in the metal and, accordingly, the hose clamp cannot be sufficient.

On the other hand, a C-shaped snap ring is known which is designed to always maintain its opening in a perfectly circular state. In the snap ring, the thickness thereof is increased to the maximum in the longitudinal center and progressively decreased up to the both ends thereof according to a distance from the center. Since the snap ring has no overlapping portions, such progressive decrease of the thickness up to the both ends is possible in the snap ring. However, the progressive decrease is impossible in the hose clamp because the hose clamp should have overlapping portions in the both ends to form finger grippable portions and must be opened by squeezing the finger grippable portions together. More particularly, in the hose clamp, the overlapping portions must be partly cut away to form mutually complementary parts extending in the annular direction, one of which is interposed between the other. Hence, there is produced a remarkable change in the width of the band metal. Thus, the progressive decrease in the thickness up to the ends is meaningless in the hose clamp because the remarkable change in the width produces an abrupt decrease in the pressing force.

Now it has been found that the hose clamp can always maintain the shape thereof substantially in a perfectly circular state if only the thickness is increased in the middle portion of the band metal. The present invention has been completed on this finding.

SUMMARY OF THE INVENTION

The inventor contemplates manufacturing a hose clamp based on the idea that the pressing force should be equalized in the annular direction of the band metal by increasing the thickness of the band metal.

The present invention provides a hose clamp which comprises employing an elastic band metal, thickness of which is maximized at the longitudinal center and decreased symmetrically on both sides of the center and progressively towards the ends of the band metal in proportion to a distance from the center until the end portions, which are located on the way to the ends and beyond which the metal has a uniform thickness, bending the band into an annular shape in the decreasing direction of the thickness to overlap the uniform thickness portions, bending further outwardly a part of each of the overlapping portions to form finger grippable portions.

BRIEF DESCRIPTION OF THE DRAWINGS

The hose clamp of the present invention is explained hereinbelow referring to the attached drawings in which.

DETAILED DESCRIPTION OF A PREFERRED EMBODIMENT

Figure 1:
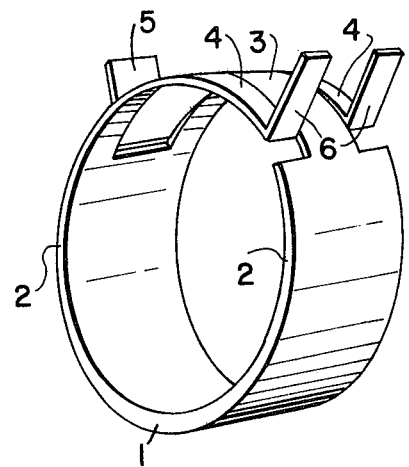
FIG. 1 is a perspective view of a hose clamp according to the present invention.
Figure 2:
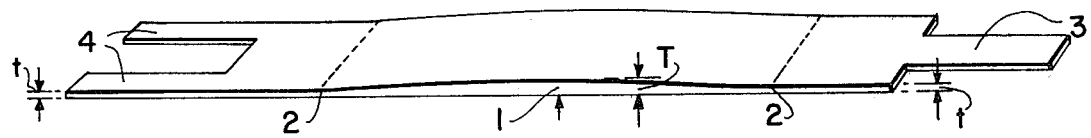
FIG. 2 is a perspective view of a metal band when the hose clamp shown in FIG. 1 is developed.

FIG. 1 shows the hose clamp according to the present invention in which the band metal is varied in its thickness only in the middle portion thereof. FIG. 2 shows a manner in which the thickness is varied.

In FIGS. 1 and 2, numeral reference 1 denotes the longitudinal center in the bending direction of the band metal, numeral 2 designates the end portions of decrease in thickness of the band metal, numeral 3 designates an inner piece of overlapping portion on the band metal, numeral 4 designates outer pieces of the overlapping portion in the band metal, numeral 5 designates a finger grippable portion formed at the end of inner piece 3, and numeral 6 designates finger grippable portions formed at the end of the outer piece 4.

In FIGS. 1 and 2, the band metal has an equal width throughout the entire band metal except overlapping portions; that is, the inner piece 3 and outer pieces 4, but has the thickness varying at the middle portion in the bending direction of the band metal. Such varying manner in the thickness is that the thickness is of the maximum value T at the center 1, and decreased gradually towards the end portions 2 in both sides of the center. Such decreasing state is symmetrical on both sides of the center. The decreasing of thickness of metal is stopped at the end portions 2, and a flattening is commenced at the position 2 towards the ends of the metal. The beginning of both end portions 2 are located on the way to the inner piece 3 or the outer pieces 4 and at the equal distance from the center 1. The end portions commencing from the positions marked 2 have a uniform thickness towards the ends of the band metal.

The band metal shown in FIG. 2 is bent into a generally annular shape as shown in FIG. 1, so that the center 1 forms the bottom; both sides of the bottom form circular arcs standing on the bottom; the inner piece 3 is positioned between the outer pieces 4 to form an overlapping portion; and these pieces cooperate together to complete the annular shape.

Particularly, the inner piece is provided by cutting both side portions of the band metal to leave a portion having the width of a half of that of the metal piece and extending at the middle portion in the longitudinal direction, while the outer pieces are provided by cutting the middle portion in the longitudinal direction of the band metal to leave a pair of portions, each of which has the width of one-fourth of that of the metal piece and extends at each side in the longitudinal direction, and the inner piece 3 is interposed between the outer pieces 4. The forward part of each of the inner and outer pieces is bent in the outward direction to form a finger grippable portion. The resulting article is a hose clamp shown in FIG. 1.

As mentioned above, the hose clamp requires that the band metal be bent into a cylindrical shape to form overlapping portions, parts of which are further bent outwardly to form finger grippable portions. The overlapping portions extend to form arcs having a center angle between 50° and 80°. The overlapping portions consist of an inner piece and outer pieces, the former to be interposed between the latter and, as a result, the width of the band metal is greatly varied. Accordingly, in the overlapping portions, elastic force of the band metal is greatly weakened owing to abrupt decrease of the band metal. Therefore, it is not required that the elastic force be weakened by decreasing further the thickness of the band metal. Thus, the variation in the thickness is enough if the thickness is varied along an arc of the center angle between 30° and 123°. In other words, the point at which the end portion 2 starts in FIGS. 1 and 2 is situated from the center 1 at a distance of an arc length having a center angle between 30° and 123°.

In varying the thickness of a band metal, the thickness is preferably varied to have the maximum thickness T at the center 1 and the thickness t of the end portions 2. The thickness T is normally between 1.05 and 1.5 times the thickness t. The difference between the thicknesses T and t is by far smaller than a curvature formed when the band metal is bent into an annular shape. Particularly, the thickness T is approximately between one-tenth and one-thousandth of the curvature. The distance between the points where the end portions 2 of uniform thickness start is normally more than half, and less than three-fourths, of the circumferential length of the circle.

By way of an example of the present invention, when a rubber hose of nominal diameter of 10 mm was to be clamped, a hose clamp was used which was manufactured from a band metal as shown in FIG. 2. Particularly, the band metal had the total length of 50 mm, the maximum width of 8 mm, the maximum thickness T of 0.7 mm at the center, which was decreased progressively in the range of length of 4.65 mm from the center 1 up to the end portions at which the thickness is of 0.63 mm. Beyond the points where the end portions 2 start, a uniform thickness of 0.63 mm continued up to the ends. An inner piece and outer pieces were provided in the forward portions of the uniform thickness. The band metal was then bent into a cylindrical form of 10 mm in diameter to place the inner portion between the outer portions. The forward part of each of the inner and outer pieces was outwardly bent to form a finger grippable portion. The thickness varying portion extended on both sides of the center to form arcs of center angle 50° from the center 1 to each position 2. When the hose clamp was applied to the rubber hose, the hose clamp was observed to press the rubber hose uniformly and to be enough to maintain the rubber hose gastight.

According to the present invention, since the band metal has a thickness progressively decreased from the center 1 towards each position 2, the band metal has the maximum resistance at the center 1 and a progressively decreased resistance towards the positions 2 when the band metal is to be bent. Moreover, the band metal has the thickness decreased in a symmetrical manner on both sides of the center 1, and the thickness is gradually decreased in proportion to the distance from the center 1, and resistance to deformation of the metal band is of the maximum at the center 1, gradually decreased in proportion to a distance from the center 1. Thus, the clamp according to the present invention presses a rubber or plastic hose uniformly with an equal strength at every portion in the annular direction, if the hose to be clamped is varied in the diameter thereof. In other words, when the conventional hose clamp, which has nothing but a uniform thickness, is opened by squeezing the finger grippable portions, the clamp has the maximum curvature at the center 1 and, as a result, takes an oval shape. In contrast, the hose clamp according to the present invention can be made to exert the maximum stress at the center 1 and a progressively decreased stress at the other portion in proportion to a distance from the center 1. Hence the clamp can always maintain the state of a perfect circle, even when the clamp is forcibly opened to some extent. The hose clamp according to the present invention, therefore, can press a hose uniformly with an equal force at every portion, even if the hose is inserted having different diameters, and can surely prevent leakage of the gas or liquid in the hose.

Furthermore, according to the present invention, since the band metal can be used without perforating the band metal and without weakening the pressing force of the band metal, the clamp can press the hose most effectively using a small quantity of metal material. In particular, the clamp according to the present invention can advantageously save approximately 20% of the material when compared with the clamp with the perforations.

Accordingly, the hose clamp in the present invention can be advantageously used for connecting gas hoses, fuel hoses in cars, oil pressure apparatus, water supplying apparatus and so on.

What is claimed:

1. A hose clamp for clamping a hose having a diameter, said clamp consisting of an elastic band metal having a thickness, said thickness being maximized at the longitudinal center of the band, decreased symmetrically on both sides of the center, progressively towards the ends of the band metal in proportion to a distance from the center as far as end portions, which are located on the way to the ends, the band metal being bent into an annular shape having a diameter smaller than said diameter of said hose in the decreasing direction of the thickness to cross both ends of the metal forming an overlapping portion, each of the ends being cut to form complementary portions mutually fitting in said overlapping portion and being provided with a holding portion projecting radially outward, the end portions being of uniform thickness; whereby when said holding portions are squeezed toward one another, said diameter of said annular shape expands uniformly, and when the squeezed clamp encircles a hose to be clamped and is released, said clamp uniformly clamps the hose solely by its elasticity.

* * * * *